(12) United States Patent  (10) Patent No.: US 8,369,700 B2
Oouchida  (45) Date of Patent: Feb. 5, 2013

(54) DISTANCE MEASUREMENT AND PHOTOMETRY DEVICE, AND IMAGING APPARATUS

(75) Inventor: Shigeru Oouchida, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/017,576

(22) Filed: Jan. 31, 2011

(65) Prior Publication Data

US 2011/0188843 A1 Aug. 4, 2011

(30) Foreign Application Priority Data

Feb. 3, 2010 (JP) ................................. 2010-022353

(51) Int. Cl.
*G02B 7/28* (2006.01)
(52) U.S. Cl. ...................................... 396/111; 356/3.14
(58) Field of Classification Search ................... 396/111
See application file for complete search history.

(56) References Cited

U.S. PATENT DOCUMENTS

| | | | |
|---|---|---|---|
| 6,434,332 B1 * | 8/2002 | Kindaichi | 396/123 |
| 6,785,468 B2 | 8/2004 | Takasaki | |
| 7,020,391 B2 * | 3/2006 | Ohkado | 396/111 |
| 7,164,856 B2 | 1/2007 | Taniguchi | |
| 7,750,970 B2 * | 7/2010 | Ide et al. | 348/345 |
| 2002/0036779 A1 * | 3/2002 | Kiyoi et al. | 356/606 |
| 2003/0103769 A1 | 6/2003 | Ohkado | |
| 2003/0147638 A1 | 8/2003 | Takasaki et al. | |
| 2004/0047621 A1 | 3/2004 | Shimizu et al. | |
| 2004/0071457 A1 * | 4/2004 | Nonaka et al. | 396/89 |

FOREIGN PATENT DOCUMENTS

| | | |
|---|---|---|
| CN | 1438534 | 8/2003 |
| JP | H5-158107 | 6/1993 |
| JP | 2003-140028 | 5/2003 |
| JP | 2006-112810 | 4/2006 |
| JP | 3958055 | 5/2007 |
| JP | 2007-322128 | 12/2007 |
| JP | 4217491 | 11/2008 |
| JP | 4226936 | 12/2008 |

OTHER PUBLICATIONS

U.S. Appl. No. 12/980,809, filed Dec. 29, 2010, Oouchida.
Korean Office Action dated Aug. 21, 2012, in Korean Patent Application No. 10-2011-0008951.
Chinese Office Action dated Aug. 24, 2012, in Chinese Patent Application No. 201110033552.9 (with English translation).

* cited by examiner

*Primary Examiner* — W. B. Perkey
*Assistant Examiner* — Linda B Smith
(74) *Attorney, Agent, or Firm* — Oblon, Spivak, McClelland, Maier & Neustadt, L.L.P.

(57) ABSTRACT

The distance measurement and photometry device includes: a case having an opening in its front surface; a rectangular lens array which is located on a front surface side of the case, which is made of a transparent resin material, and in which first and second distance measurement lenses and a photometry lens located between the distance measurement lenses are integrally formed in line; an image sensor board which is shaped like a thin plate, which is arranged on a back surface side of the case, and which is located opposed to the lens array; and two-dimensional distance measurement image sensors and photometry image sensor which are arranged on the image sensor board.

8 Claims, 5 Drawing Sheets

DISTANCE MEASUREMENT AND PHOTOMETRY DEVICE, AND IMAGING APPARATUS

CROSS-REFERENCE TO THE RELATED APPLICATION

This application is based on and claims the priority benefit of Japanese Patent Application No. 2010-22353, filed on Feb. 3, 2010, the contents of which are incorporated herein by reference.

BACKGROUND OF THE INVENTION

1. Field of the Invention

The present invention relates to a distance measurement and photometry device for measuring a distance to a measurement target as well as measuring the brightness of the measurement target, and to an imaging apparatus, such as a digital still camera or a digital video camera, including the distance measurement and photometry device.

2. Description of the Related Art

Heretofore, in a digital still camera (hereinafter called a "digital camera") and the like including external measurement type distance measurement device and photometry device, the distance measurement device and the photometry device are integrated into one unit for reduction in size of a camera main body and the like (see Japanese Patent No. 3958055, for example).

A distance measurement and photometry device shown in Japanese Patent No. 3958055 includes multiple pairs of distance measurement line sensors and multiple photometry sensors arranged between the multiple pairs of distance measurement line sensors, the distance measurement line sensors and the photometry sensors being arranged on a single chip.

However, since the distance measurement line sensors are arranged for the entire image plane in a digital camera including the conventional external measurement type distance measurement and photometry device, the digital camera can perform distance measurement only on three distance measurement regions, i.e., a central portion of the image plane and portions to the right and left of the central portion. This poses a problem that distance measurement cannot be performed on a main object accurately if the main object is located near an upper left portion of the image plane which is outside the distance measurement regions, for example. Further, regions in which photometry is performed by the photometry sensors are located near the three distance measurement regions. This poses another problem that photometry cannot be performed on a main object accurately if the main object is located near an upper left portion of the image plane which is outside the photometry regions, for example.

SUMMARY OF THE INVENTION

An object of the present invention is to provide a distance measurement and photometry device and an imaging apparatus using the distance measurement and photometry device which allow performing accurate distance measurement and photometry wherever a measurement target is.

To achieve the above object, a distance measurement and photometry device according to an embodiment of the present invention includes: a pair of distance measurement sensors arranged at a predetermined interval; a photometry sensor arranged between the distance measurement sensors; a pair of distance measurement lenses configured to form images of a distance measurement target on the distance measurement sensors, respectively; a photometry lens configured to form an image of the distance measurement target on the photometry sensor; a distance calculation unit configured to calculate a distance to the distance measurement target on the basis of a signal outputted from each of the distance measurement sensors; and a photometry calculation unit configured to calculate brightness of the distance measurement target on the basis of a signal outputted from the photometry sensor. The distance measurement sensors and the photometry sensor are formed on a single sensor board and are each a two-dimensional sensor having a plurality of light receiving elements arranged in a planar fashion.

DETAILED DESCRIPTION OF THE PREFERRED EMBODIMENTS

Preferred embodiments of the present invention will be explained in detail hereinafter with reference to the accompanying drawings.

First Embodiment

Figure 1:
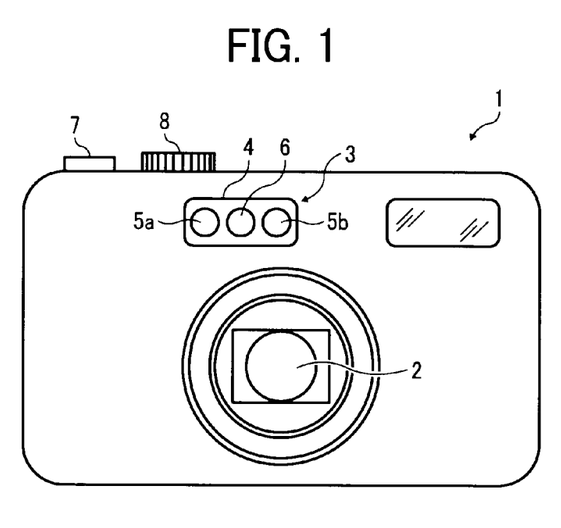
FIG. 1 is a front view showing a digital camera which is an example of an imaging apparatus including a distance measurement and photometry device according to a first embodiment of the present invention.

FIG. 1 shows a digital camera which is an example of an imaging apparatus including a distance measurement and photometry device according to a first embodiment of the present invention.

(Exterior Configuration of Digital Camera)

As shown in FIG. 1, on a front surface (anterior surface) side of a digital camera 1 according to this embodiment, an imaging lens system 2, a lens array 4, and the like are arranged. The lens array 4 is located on a front surface side of a distance measurement and photometry device 3. On a surface of the lens array 4, first and second distance measurement lenses 5a and 5b and a photometry lens 6 are formed integrally (the distance measurement and photometry device 3 will be described in detail later). The first and second distance measurement lenses 5a and 5b are arranged in a horizontal direction at a predetermined interval. The photometry lens 6 is arranged between the first and second distance measurement lenses 5a and 5b. The imaging lens system 2, the first and second distance measurement lenses 5a and 5b, and the photometry lens 6 have optical axes parallel to one another.

(System Configuration of Digital Camera 1)

Figure 2:
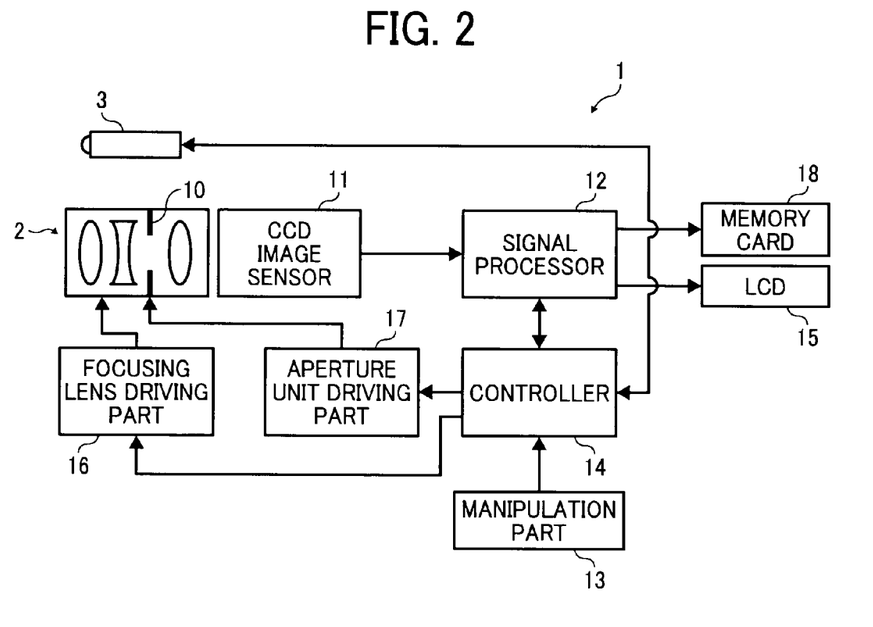
FIG. 2 is a block diagram showing a brief system configuration of the digital camera according to the first embodiment.

As shown in FIG. 2, the digital camera 1 includes: the imaging lens system 2 having multiple lens groups; an aperture unit 10 having a shutter function; a CCD image sensor 11 being a solid-state image sensor configured to form an image of an object image coming through the imaging lens system 2, on a light-receiving surface; a signal processor 12 configured to capture an imaging signal (electric signal) outputted from each pixel of the CCD image sensor 11 and to convert the captured signal into image data which can be displayed and recorded; a manipulation part 13 including a release button 7, an imaging mode switching button 8, and the like (see FIG. 1); a controller 14 configured to perform control on the entire system of the digital camera 1 based on a control program stored in a ROM (not shown) in response to manipulation input information from the manipulation part 13; a liquid crystal monitor (LCD) 15 configured to display the image data generated by the signal processor 12; a focusing lens driving part 16 configured to drive a focusing lens group of the imaging lens system 2; an aperture unit driving part 17 configured to drive the aperture unit 10; the external measurement type distance measurement and photometry device 3 configured to measure a distance to an object and to measure the brightness of the object; and the like. The image data generated by the signal processor 12 is stored in a memory card 18 which is detachable from the digital camera 1.

(Configuration of Distance Measurement and Photometry Device 3)

Figure 3:
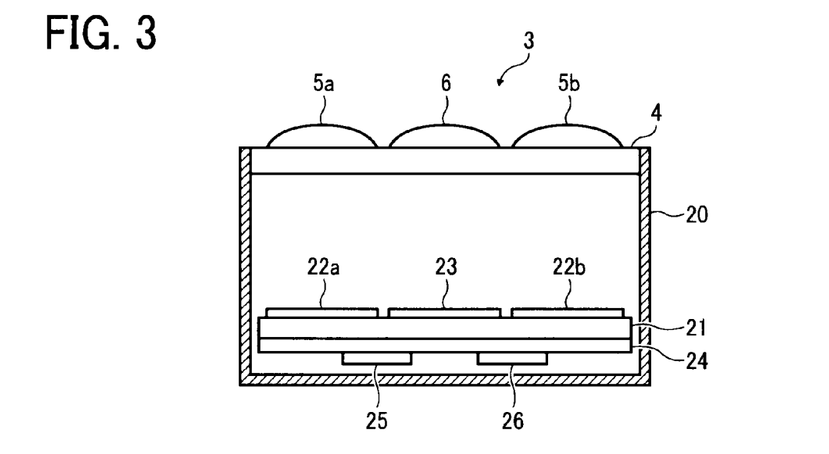
FIG. 3 is a schematic cross-sectional side view showing the distance measurement and photometry device according to the first embodiment.
Figure 4:
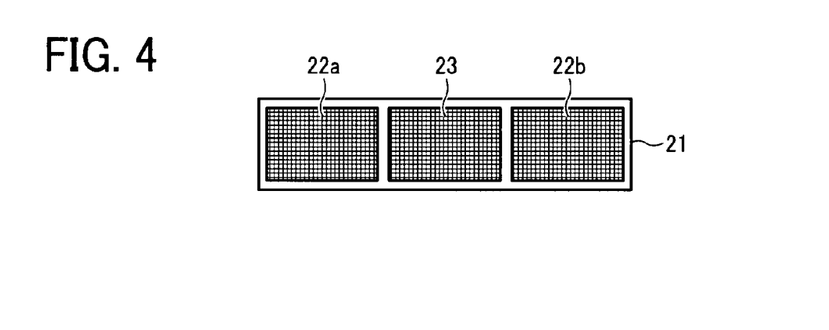
FIG. 4 is a plan view showing paired distance measurement image sensors and a photometry image sensor of the distance measurement and photometry device according to the first embodiment.

As shown in FIGS. 3 and 4, the distance measurement and photometry device 3 includes: a case 20 having an opening in its front surface (upper side in FIG. 3); the rectangular lens array 4 which is located on a front surface side of the case 20, which is made of a transparent resin material, and in which the first and second distance measurement lenses 5a and 5b and the photometry lens 6 are integrally formed in line (in a horizontal direction of the digital camera 1); an image sensor board 21 which is shaped like a thin plate, which is arranged on a back surface side (lower side in FIG. 3) of the case 20, and which is located opposed to the lens array 4; distance measurement image sensors 22a and 22b being planar (two-dimensional) distance measurement sensors arranged on the image sensor board 21; a photometry image sensor 23 being a planar (two-dimensional) photometry sensor arranged on the image sensor board 21; and a circuit board 24 arranged on the back surface of the image sensor board 21.

The paired planar distance measurement image sensors 22a and 22b are arranged opposed to the first and second distance measurement lenses 5a and 5b. Meanwhile, the planar photometry image sensor 23 located between the distance measurement image sensors 22a and 22b is arranged opposed to the photometry lens 6.

The planar light-receiving surfaces of the respective distance measurement image sensors 22a and 22b and photometry image sensor 23 have the same size and the same number of pixels. Moreover, a predetermined gap is provided between the photometry image sensor 23 and each of the distance measurement image sensors 22a and 22b.

The distance measurement image sensors 22a and 22b and the photometry image sensor 23 on the image sensor board 21 are image sensors, such as CCDs or CMOSs, integrally formed on a semiconductor wafer with a known semiconductor process, and each having multiple light receiving elements (pixels) arranged in a lattice (the distance measurement image sensors 22a and 22b and the photometry image sensor 23 will be described in detail later).

The optical axes of the respective first and second distance measurement lenses 5a and 5b and photometry lens 6 are parallel to one another. The diagonal centers of the light receiving surfaces of the distance measurement image sensors 22a and 22b and photometry image sensor 23 are positioned to substantially match the optical axes of the lenses (the first and second distance measurement lenses 5a and 5b and the photometry lens 6), respectively.

The first and second distance measurement lenses 5a and 5b have such focal distances that light beams from the object that have entered the first and second distance measurement lenses 5a and 5b may form images on surfaces of the distance measurement image sensors 22a and 22b, respectively. The photometry lens 6 has such a focal distance that a light beam from the object that has entered the photometry lens 6 may form an image on a surface of the photometry image sensor 23.

Further, it is designed such that the angles of view of the first and second distance measurement lenses 5a and 5b and photometry lens 6 may be each substantially equal to the angle of view of the imaging lens system 2. This allows the distance measurement and photometry device 3 to perform distance measurement and photometry on the entire image plane that covers the entire light receiving surface (imaging region) of the CCD image sensor 11.

The circuit board 24 is provided with a distance measurement calculation part 25, a photometry calculation part 26, and the like. The distance measurement calculation part 25 is configured to capture pixel output signals outputted from the pixels of the distance measurement image sensors 22a and 22b and to calculate a distance to the object by calculating the displacement (parallax) between the object images respectively formed on the distance measurement image sensors 22a and 22b. The photometry calculation part 26 is configured to capture pixel output signals outputted from the pixels of the photometry image sensor 23 and to calculate the brightness of the object.

The distance information thus calculated by the distance measurement calculation part 25 and the brightness information thus calculated by the photometry calculation part 26 are outputted to the controller 14. The controller 14 includes a distance calculation unit configured to calculate a distance to a distance measurement target on the basis of the signals outputted from the distance measurement sensors, and a photometry calculation unit configured to calculate the brightness of the distance measurement target on the basis of the signals outputted from the photometry sensor. The controller 14 outputs a drive control signal to the focusing lens driving part 16 on the basis of the inputted distance information so that the camera may be focused on the object, and outputs a drive control signal to the aperture unit driving part 17 on the basis of the inputted brightness information so that the object may be correctly exposed.

Figure 5:
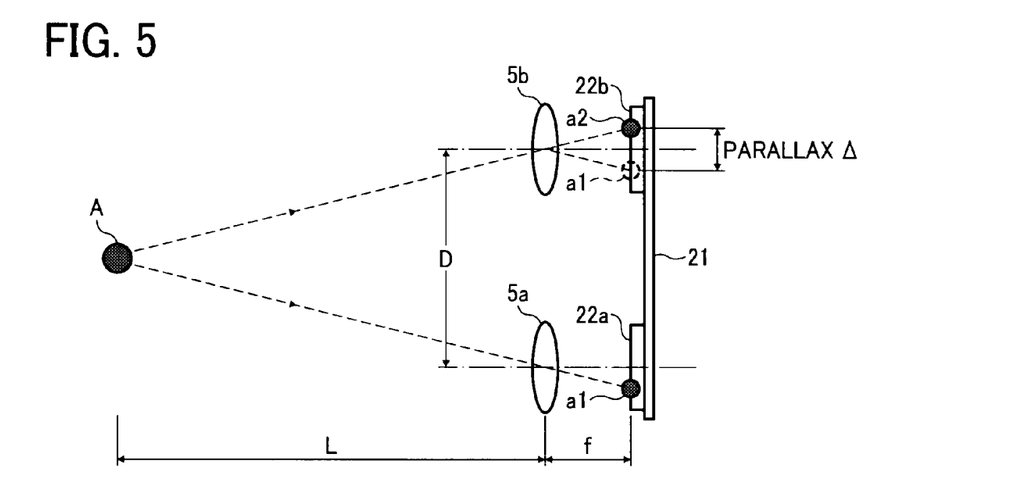
FIG. 5 is a schematic view illustrating the principle of distance measurement by the distance measurement and photometry device.

Now, description will be given of the principle of distance measurement performed by the distance measurement and photometry device 3.

As shown in FIG. 5, an image of a certain point on an object A is formed on the surface of the distance measurement image sensor 22a as an object image a1 and an image of the certain point is formed on the surface of the distance measurement image sensor 22b as an object image a2 with the object images a1 and a2 displaced from each other by a parallax $\Delta$. The images are then received by the multiple light receiving elements (pixels) and converted into electric signals. Note that, in FIG. 5, the photometry lens 6 arranged between the first and second distance measurement lenses 5a and 5b and the photometry image sensor 23 arranged between the distance measurement image sensors 22a and 22b are omitted.

The following formula (1) is satisfied when $\Delta$ indicates the parallax, D indicates a distance between the optical axes of the first and second distance measurement lenses 5a and 5b (base-line length), L indicates a distance between the object A and each of the first and second distance measurement lenses 5a and 5b, f indicates a focal distance of each of the first and second distance measurement lenses 5a and 5b, and when L>>f.

$$L = D \cdot f / \Delta \qquad \text{formula (1)}$$

Since D and f are known, the distance L between the object A and each of the first and second distance measurement lenses 5a and 5b can be calculated by causing the distance measurement calculation part 25 to calculate the parallax $\Delta$ with a well-known calculation method from the pixel output signals respectively outputted from the pixels (light receiving elements) of the distance measurement image sensors 22a and 22b.

Note that, if the distance (base-line length) D between the optical axes of the first and second distance measurement lenses 5a and 5b is too small, the parallax $\Delta$ is too small to calculate the distance L to the object A accurately.

(Distance Measurement and Photometry Operation by Distance Measurement and Photometry Device 3)

Next, description will be given of a distance measurement and photometry operation performed by the distance measurement and photometry device 3 when an object is imaged with the digital camera 1.

When a photographer half-presses the release button 7 while the power switch is ON, the controller 14 outputs a distance measurement and photometry start instruction signal to the distance measurement and photometry device 3. Light beams from the object that have entered the first and second distance measurement lenses 5a and 5b form images on the surfaces of the distance measurement image sensors 22a and 22b, respectively, and a light beam that has entered the photometry lens 6 forms an image on the surface of the photometry image sensor 23. As described above, the distance measurement calculation part 25 captures the pixel output signals outputted from all the pixels of the distance measurement image sensors 22a and 22b and calculates a distance to the object by calculating the displacement (parallax) between the object images respectively formed on the distance measurement image sensors 22a and 22b. In this event, the photometry calculation part 26 captures the pixel output signals outputted from the pixels of the photometry image sensor 23 and calculates the brightness of the object on the basis of the magnitude of the pixel outputs. The information on the distance to the object and the information on the brightness of the object thus calculated are outputted to the controller 14.

The controller 14 performs control to drive the focusing lens driving part 16 on the basis of the inputted distance information. Thereby, the focusing lens driving part 16 moves the focusing lens group of the imaging lens system 2 to a focused position so that an object image may be formed on the light receiving surface of the CCD image sensor 11.

The controller 14 also performs control to drive the aperture unit driving part 17 on the basis of the inputted brightness information. Thereby, the aperture unit driving part 17 sets an opened state of the aperture unit 10 (aperture value), the number of actuations of the electronic shutter of the CCD image sensor 11, and the like so that the object may be correctly exposed.

When the release button 7 is fully pressed, the object is imaged under a focused state and with appropriate exposure conditions (the number of actuations of the electronic shutter of the CCD image sensor 11, the aperture value of the aperture unit 10, and the like). Then, the signal processor 12 captures imaging signals outputted from the pixels of the CCD image sensor 11 and converts the captured signals into image data which can be displayed and recorded. The image data generated by the signal processor 12 is displayed on the liquid crystal monitor (LCD) 15 as an image, or recorded in the memory card 18.

As described above, according to the digital camera 1 including the distance measurement and photometry device 3 of this embodiment, the distance measurement and photometry device 3 is capable of performing accurate distance measurement and photometry on a wide range over the entire image plane on the basis of the pixel output signals outputted from the entire pixel plane of each of the planar distance measurement image sensors 22a and 22b and photometry image sensor 23. This allows the digital camera 1 to accurately measure the distance to the object and the brightness of the object wherever the object is in the image plane, thereby achieving a high-quality image.

Next, the distance measurement image sensors 22a and 22b and the photometry image sensor 23 of the distance measurement and photometry device 3 will be described in detail.

The paired distance measurement image sensors 22a and 22b and the photometry image sensor 23 on the image sensor board 21 are integrally formed on a semiconductor wafer with a known semiconductor process, and pixels are patterned on each sensor with a mask. In the patterning, a mask having such a pattern that the pixel matrices of the distance measurement image sensors 22a and 22b and the photometry image sensor 23 are parallel to one another is used. Moreover, since a surface of the semiconductor wafer is planar, the normals to the respective distance measurement image sensors 22a and 22b and photometry image sensor 23 are necessarily parallel to one another. Thereby, the distance measurement image sensors 22a and 22b are arranged without any angular displacement of their light receiving surfaces, thus allowing accurate distance measurement.

Further, the distance measurement image sensors 22a and 22b and the photometry image sensor 23 of the distance measurement and photometry device 3 which are used in this embodiment are significantly smaller in size than the image sensor of the CCD image sensor 11 used in the digital camera 1 for the imaging of the object. Thus, for example, image sensors of camera modules generally implemented in mobile phones and the like can be used as the distance measurement image sensors 22a and 22b and the photometry image sensor 23 of the distance measurement and photometry device 3.

Such image sensors for camera modules of mobile phones are mass-produced and thus advantageous in terms of cost. Image sensors of VGA (640×480 pixels) size are especially low in cost. Such image sensors of VGA size are as large as approximately ⅒ inches.

Figure 6:
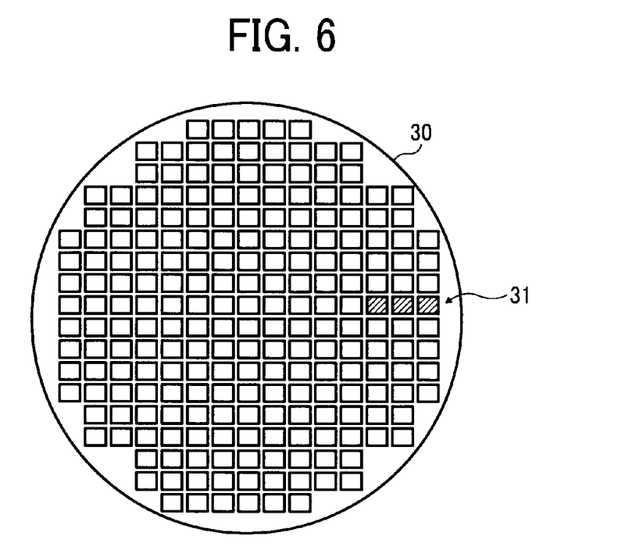
FIG. 6 is a plan view showing multiple image sensors formed on a semiconductor wafer.

As shown in FIG. 6, three adjacent image sensors arranged in line (for example, three image sensors shown in diagonal lines) are cut out from a semiconductor wafer 30 having multiple image sensors 31 of VGA size formed thereon through a known semiconductor process. Thereby, the image sensor board 21 as shown in FIG. 4 in which the paired distance measurement image sensors 22a and 22b and the photometry image sensor 23 located between the sensors 22a and 22b are integrally formed on its surface can be achieved easily and at low cost. Thus, the distance measurement and photometry device 3 can be reduced in cost.

Further, it is not necessary to add a process such as implementing the distance measurement image sensors 22a and 22b and the photometry image sensor 23 located between the sensors 22a and 22b, which are used in the distance measurement and photometry device 3, on the image sensor board 21 with these sensors individually positioned on the board 21. This allows keeping a state where the distance measurement image sensors 22a and 22b and the photometry image sensor 23 located between the sensors 22a and 22b are accurately positioned on the image sensor board 21 for a long period, and thereby allows performing accurate distance measurement for a long period.

Second Embodiment

Figure 7:
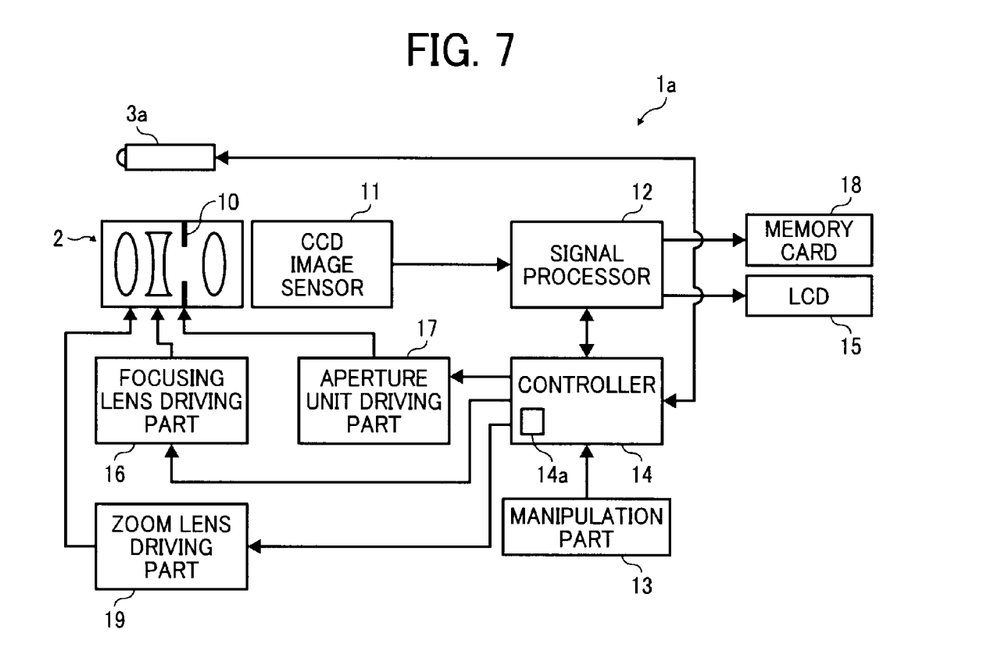
FIG. 7 is a block diagram showing a brief system configuration of the digital camera according to a second embodiment.

FIG. 7 is a block diagram showing a digital camera which is an example of an imaging apparatus including a distance measurement and photometry device according to a second embodiment of the present invention.

As shown in FIG. 7, a digital camera 1a of this embodiment includes a zoom lens group in the imaging lens system 2, and thus includes a zoom lens driving part 19. Further, the controller 14 includes an auto-focus controller (hereinafter called "AF controller") 14a configured to perform auto-focus control based on imaging signals captured from the CCD image sensor 11. The configuration of the digital camera 1a excluding a distance measurement and photometry device 3a is the same as that of the first embodiment shown in FIG. 2, and thus overlapping description will be omitted (the distance measurement and photometry device 3a of this embodiment will be described in detail later).

Figure 8A:
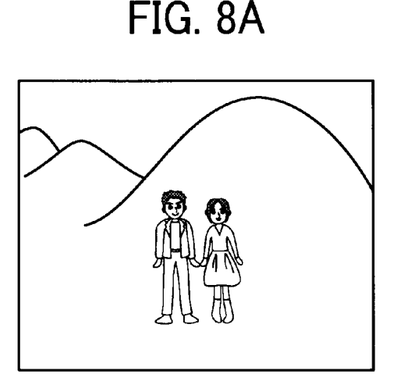
FIG. 8A is a view showing an example of an image taken with lenses zoomed out to a wide-angle side.
Figure 8B:
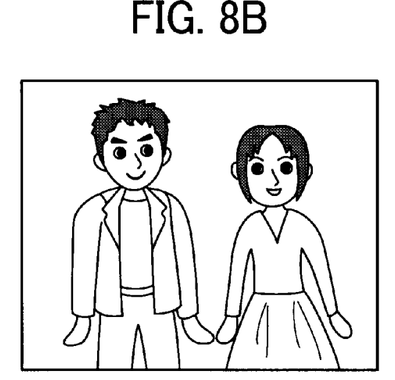
FIG. 8B is a view showing an example of an image taken with the lens system zoomed in to a telephoto side.

In this embodiment, the zoom lens group is included in the imaging lens system 2. Hence, in a case where the digital camera 1a has a 28 mm to 300 mm (35 mm equivalent) high-powered optical zoom function, for example, as shown in FIGS. 8A and 8B, an extreme wide-angle (FIG. 8A) and an extreme telephoto (FIG. 8B) are greatly different in imaging angle of view (imaging range). Note that, in FIGS. 8A and 8B, two persons at the center are an object.

In this manner, in the digital camera 1a including the high-powered optical zoom function, the extreme wide-angle and the extreme telephoto are greatly different in imaging angle of view. The imaging angle of view at the time of imaging with the lens system zoomed in to the extreme telephoto is far smaller than the imaging angle of view of the extreme wide-angle. Now assume a case where only a set of the photometry lens and the photometry image sensor is provided in the distance measurement and photometry device 3 as in the first embodiment and where the angle of view of the photometry lens is set to the imaging angle of view of the extreme wide-angle, for example. In this case, when the object is imaged with the lens system zoomed in to the extreme telephoto and if a bright light source and the like is provided outside the imaging angle of view at the time of imaging, photometry has to be performed with the brightness of the light source taken into account since the angle of view of the photometry lens is set to the imaging angle of view of the extreme wide-angle. For this reason, photometry sometimes cannot be performed appropriately for the object within the imaging angle of view at the time of imaging.

Figure 9A:
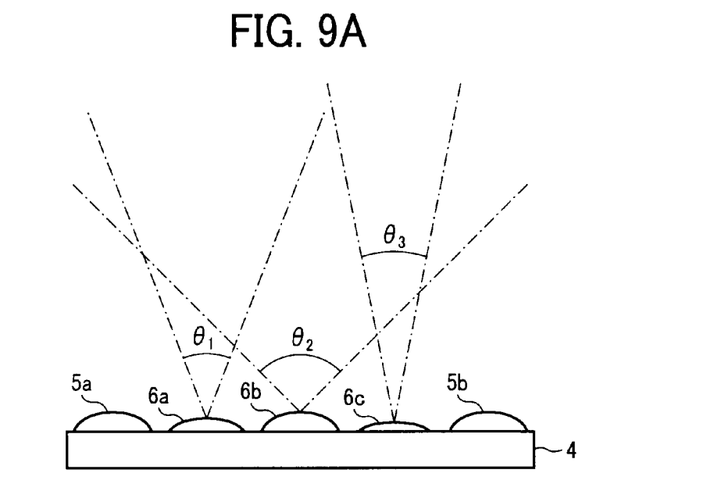
FIG. 9A is a side view showing paired distance measurement lenses and three photometry lenses, which are different in angle of view, of a distance measurement and photometry device according to the second embodiment of the present invention.
Figure 9B:
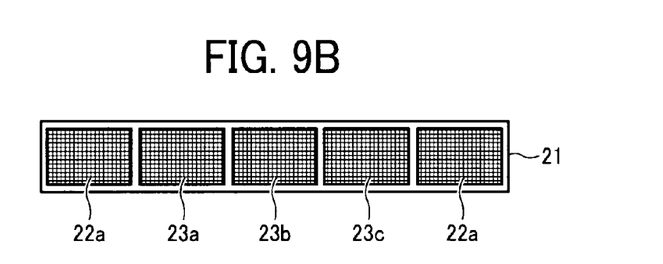
FIG. 9B is a side view showing paired distance measurement image sensors and three photometry image sensors, which are arranged between the sensors, of the distance measurement and photometry device according to the second embodiment.

To address this problem, in the distance measurement and photometry device 3a of this embodiment, three photometry lenses 6a, 6b, and 6c different in angle of view are formed in line between the paired first and second distance measurement lenses 5a and 5b formed on both sides of the lens array 4, and the paired distance measurement image sensors 22a and 22b and three photometry image sensors 23a, 23b, and 23c are formed on the image sensor board 21 to be opposed to the first and second distance measurement lenses 5a and 5b and the photometry lenses 6a, 6b, and 6c, respectively, as shown in FIGS. 9a and 9b. Note that, the distance measurement image sensors 22a and 22b and the three photometry image sensors 23a, 23b, and 23c have the same size and the same number of pixels. The configuration of the distance measurement and photometry device 3a other than above is the same as that of the distance measurement and photometry device 3 of the first embodiment.

In this embodiment also, as shown in FIG. 6, five adjacent image sensors arranged in line are cut out from the semiconductor wafer 30 having the multiple image sensors 31 of VGA size formed thereon through the known semiconductor process. Thereby, the image sensor board 21 as shown in FIG. 9B in which the paired distance measurement image sensors 22a and 22b and the three photometry image sensors 23a, 23b, and 23c located between the sensors 22a and 22b are integrally formed on its surface can be achieved easily and at low cost.

In this embodiment, in a case where the imaging lens system 2 has a 28 mm to 300 mm (35 mm equivalent) high-powered optical zoom function, an angle of view θ1 of the photometry lens 6a is set to an angle equivalent to a focal length of approximately 150 mm (35 mm equivalent), an angle of view θ2 of the photometry lens 6b is set to an angle equivalent to a focal length of approximately 28 mm (35 mm equivalent), and an angle of view θ3 of the photometry lens 6c is set to an angle equivalent to a focal length of approximately 300 mm (35 mm equivalent), for example. Note that, in this embodiment, the angle of view of the paired first and second distance measurement lenses 5a and 5b is set to an angle equivalent to a focal length of approximately 28 mm (35 mm equivalent).

(Photometry Operation by Distance Measurement and Photometry Device 3a)

Next, description will be given of a photometry operation performed by the distance measurement and photometry device 3a when an object is imaged with the digital camera 1a.

The distance measurement and photometry device 3a according to this embodiment includes the three sets of the photometry lenses 6a, 6b, and 6c different in photometry angle of view and the photometry image sensors 23a, 23b, and 23c. Thus, when the imaging angle of view of the imaging lens system 2 of the digital camera 1a is changed through a zoom manipulation by the photographer, the photometry calculation part (not shown) selects one of the three sets of the photometry lenses 6a, 6b, and 6c and the photometry image sensors 23a, 23b, and 23c which is appropriate in terms of photometry angle of view in response to the information on imaging angle of view inputted from the controller 14, and captures pixel output signals outputted from the photometry image sensor of the selected set.

For example, when the imaging angle of view of the imaging lens system 2 is shifted to the wide-angle side (near 28 mm (35 mm equivalent), for example), the photometry calculation part (not shown) captures pixel output signals outputted from the photometry image sensor 23b combined with the photometry lens 6b whose angle of view is an angle equivalent to a focal length of approximately 28 mm (35 mm equivalent) in response to the information on imaging angle of view inputted from the controller 14, and calculates the brightness of the object on the basis of the magnitude of the pixel outputs.

Moreover, when the imaging angle of view of the imaging lens system 2 is shifted to the telephoto side (near 300 mm (35 mm equivalent), for example), the photometry calculation part (not shown) captures pixel output signals outputted from the photometry image sensor 23c combined with the photometry lens 6c whose angle of view is an angle equivalent to a focal length of approximately 300 mm (35 mm equivalent) in response to the information on imaging angle of view inputted from the controller 14, and calculates the brightness of the object on the basis of the magnitude of the pixel outputs.

In the same way, when the imaging angle of view of the imaging lens system 2 is shifted to approximately the middle between the extreme wide-angle and the extreme telephoto (near 150 mm (35 mm equivalent), for example), the photometry calculation part (not shown) captures pixel output signals outputted from the photometry image sensor 23a combined with the photometry lens 6a whose angle of view is an angle equivalent to a focal length of approximately 150 mm (35 mm equivalent) in response to the information on imaging angle of view inputted from the controller 14, and calculates the brightness of the object on the basis of the magnitude of the pixel outputs.

The brightness information which is appropriate for the object and calculated on the basis of the imaging angle of view of the imaging lens system 2 is outputted to the controller 14. Then, the controller 14 performs control to drive the aperture unit driving part 17 on the basis of the inputted brightness information. Thereby, the aperture unit driving part 17 sets an opened state of the aperture unit 10 (aperture value), the number of actuations of the electronic shutter of the CCD image sensor 11, and the like so that the object may be correctly exposed.

As described above, according to this embodiment, when the imaging angle of view of the imaging lens system 2 is changed through a zoom manipulation, one of the three sets of the photometry lenses 6a, 6b, and 6c different in photometry angle of view and the photometry image sensors 23a, 23b, and 23c which has an optimum angle of view can be selected for photometry. Accordingly, photometry can be performed accurately irrespective of the imaging angle of view of the imaging lens system 2 selected at the time of imaging.

(Distance Measurement by Distance Measurement and Photometry Device 3a)

Next, description will be given of a distance measurement performed by the distance measurement and photometry device 3a when an object is imaged with the digital camera 1a.

The first embodiment has such a configuration that distance measurement is performed on the basis of the pixel output signals outputted from all the pixels of the paired planar distance measurement image sensors. On the other hand, this embodiment has such a configuration that distance measurement is performed on the basis of pixel output signals outputted from only a previously-set pixel region of all the pixels of the paired planar distance measurement image sensors.

Figure 10A:
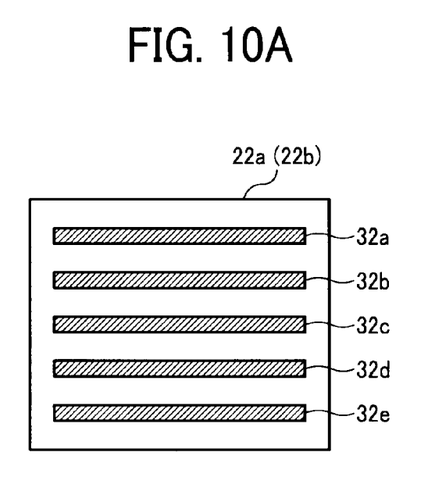
FIG. 10A is a view showing five distance measurement frame regions set in the pixel plane of each distance measurement image sensor of the distance measurement and photometry device according to the second embodiment.

Specifically, as shown in FIG. 10A, five distance measurement frame regions 32a, 32b, 32c, 32d, and 32e (range shown in diagonal lines) each having a predetermined width in a horizontal direction are set in a vertical direction at predetermined intervals in the entire pixel plane of each of the paired distance measurement image sensors 22a and 22b, and distance measurement is performed on the basis of pixel output signals outputted from the distance measurement frame regions 32a, 32b, 32c, 32d, and 32e.

Further, according to this embodiment, a distance measurement region of a predetermined range can be set out of the entire pixel plane of each of the distance measurement image sensors 22a and 22b in response to a change in imaging angle of view through a zoom manipulation of the imaging lens system 2.

Specifically, for example, when the imaging angle of view of the imaging lens system 2 is shifted to the wide-angle side (approximately 28 mm (35 mm equivalent), for example), the distance measurement target region is the entire pixel plane shown in FIG. 10A of each of the distance measurement image sensors 22a and 22b. In this case, distance measurement is performed on the basis of pixel output signals outputted from each of the five distance measurement frame regions 32a, 32b, 32c, 32d, and 32e.

Figure 10B:
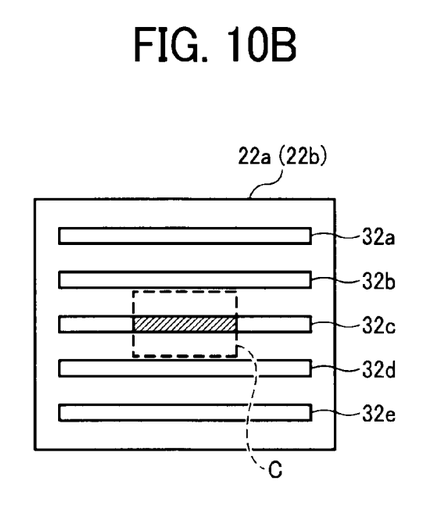
FIG. 10B is a view showing a distance measurement target region set near the center of the entire pixel plane of each distance measurement image sensor when the imaging angle of view of the imaging lens system 2 is shifted to the telephoto side.

Meanwhile, when the imaging angle of view of the imaging lens system 2 is shifted to the telephoto side (approximately 300 mm (35 mm equivalent), for example), the distance measurement target region is a narrow range C shown in FIG. 10B (within a frame shown in a dotted line) located near the center of the entire pixel plane of each of the distance measurement image sensors 22a and 22b. In this case, distance measurement is performed on the basis of pixel output signals outputted from one distance measurement frame region 32c located in the narrow range C (within the frame shown in the dotted line) near the center.

In addition, when the imaging angle of view of the imaging lens system 2 is shifted to approximately the middle between the extreme wide-angle and the extreme telephoto, the distance measurement target region is an intermediate region between the entire pixel plane shown in FIG. 10A of each of the distance measurement image sensors 22a and 22b and the narrow range C shown in FIG. 10B located near the center. In this case, distance measurement is performed on the basis of pixel output signals outputted from each of multiple distance measurement regions suited to the imaging angle of view, which are selected from the five distance measurement frame regions 32a, 32b, 32c, 32d, and 32e.

Accordingly, in this embodiment, as shown in FIG. 10A, when the imaging angle of view of the imaging lens system 2 is shifted to the wide-angle side (near 28 mm (35 mm equivalent), for example), the distance measurement calculation part 25 captures pixel output signals outputted from the five distance measurement frame regions 32a, 32b, 32c, 32d, and 32e suited to the imaging angle of view at this time and calculates a distance to the object by calculating the displacement (parallax) between object images.

Moreover, as shown in FIG. 10B, when the imaging angle of view of the imaging lens system 2 is shifted to the telephoto side (near 300 mm (35 mm equivalent), for example), the distance measurement calculation part 25 captures pixel output signals outputted from a distance measurement range of the central distance measurement frame region 32c (range shown in diagonal lines) suited to the imaging angle of view at this time and calculates a distance to the object by calculating the displacement (parallax) between object images.

The controller 14 performs control to drive the focusing lens driving part 16 on the basis of the distance information inputted by the distance measurement calculation part 25. Thereby, the focusing lens driving part 16 moves the focusing lens group of the imaging lens system 2 to a focused position so that an object image may be formed on the light receiving surface of the CCD image sensor 11.

As described above, according to this embodiment, when the imaging angle of view of the imaging lens system 2 is changed through a zoom manipulation, one or more of the previously-set five distance measurement frame regions 32a, 32b, 32c, 32d, and 32e is selected according to the imaging angle of view of the imaging lens system 2, and distance measurement is performed on the basis of pixel output signals outputted from the selected distance measurement frame regions. Such a configuration allows greatly reducing the amount of calculation as compared to the case where distance measurement is performed on the basis of the pixel output signals outputted from the entire pixel plane of each of the distance measurement image sensors 22a and 22b, and thereby allows performing distance measurement calculation processing at high speed.

When the imaging lens system 2 is zoomed in so that its imaging angle of view may be shifted to the extreme telephoto, in particular, distance measurement is performed only on the distance measurement range of the central distance measurement frame region 32c (range shown in diagonal lines) as shown in FIG. 10B. This allows further reducing the amount of calculation and thereby allows performing distance measurement calculation processing at higher speed. As a result, the amount of calculation required when the object is imaged with the imaging lens system 2 zoomed in to the telephoto side is smaller than the amount of calculation required when the object is imaged with the imaging lens system 2 zoomed out to the wide-angle side. Accordingly, high-speed focus control is possible even at the time of imaging on the telephoto side in which the amount of feed of the lens group is large (zoom magnification is high).

(Focus Operation (Auto-Focus Operation) by AF Controller 14a)

In addition to the external measurement type distance measurement and photometry device 3, the digital camera 1a of this embodiment includes the AF controller 14a configured to perform auto-focus control based on imaging signals captured in the controller 14 from the CCD image sensor 11.

The AF controller 14a captures imaging signals, which are outputted from the CCD image sensor 11, through the signal processor 12, and calculates an AF (auto-focus) evaluation value from the imaging signals thus captured.

The AF evaluation value is calculated from an integrated value of outputs from a high frequency component extraction filter, or from an integrated value of differences in brightness between adjacent pixels, for example. In a focused state, an edge portion of the object is clear and thus the highest high frequency component is achieved. By using the above characteristics, at the time of the AF operation (auto-focus detection operation), the AF operation is executed in such a manner that an AF evaluation value is acquired at each focus position of the imaging lens system 2 and the position at which the largest AF evaluation value is achieved is set as an auto-focus detection position.

Specifically, when the release button 7 (see FIG. 1) is pressed (half-pressed), the AF controller 14a instructs the focusing lens driving part 16 so that the focusing lens driving part 16 may be driven to move the focusing lens group of the imaging lens system 2 in its optical axis direction, and an AF operation of a contrast evaluation system, which is a so-called "hill-climbing AF," is executed, for example. If an AF (auto-focus) target range extends across the entire region from infinite to close, the focusing lens group of the imaging lens system 2 is moved to each focus position while being moved from close to infinite or from infinite to close, and the AF evaluation value at the focus position is acquired. Then, the position at which the largest AF evaluation value is achieved is set as an auto-focus position, and the focusing lens group is moved to the auto-focus position for focusing.

As described above, the digital camera 1a of this embodiment includes the AF controller 14a configured to perform auto-focus control based on imaging signals captured from the CCD image sensor 11, in addition to the external measurement type distance measurement and photometry device 3. The digital camera 1a thereby executes, at the same time, the focus operation based on the distance information obtained by the distance measurement and photometry device 3a and the focus operation performed by the AF controller 14a. This allows focusing the camera on the object quickly and accurately.

To be more specific, in the focus operation by the AF controller 14a, at the time of imaging on the telephoto side in which the amount of feed of the lens group is large (zoom magnification is high), for example, the amount of movement of the focusing lens group of the imaging lens system 2 is increased and thus it may take time for the camera to be focused in some cases.

To address this problem, according to this embodiment, the focusing lens group of the imaging lens system 2 is first moved to a position near a focus position quickly on the basis of the distance information obtained by the distance measurement and photometry device 3a, and is then moved to the focus position through the focus operation by the AF controller 14a. Thereby, the range in which the focusing lens group is moved at the time of the focus operation by the AF controller 14a can be reduced. This allows focusing the camera on the object quickly and accurately, and thus allows the photographer to take images without missing the right moment to release the shutter.

Note that, it is also possible to select, through a switching manipulation by the manipulation part 13, any one of the focus operation based on the distance information obtained by the distance measurement and photometry device 3a and the focus operation performed by the AF controller 14a, and to perform the focus operation of the selected type (on the distance measurement and photometry device 3a side, for example).

As has been described thus far, the distance measurement and photometry device and the imaging apparatus according to the present invention allow performing distance measurement and photometry on a distance measurement target (object) accurately wherever the distance measurement target (object) is, on the basis of pixel output signals outputted from the entire pixel plane of each of the paired distance measurement sensors and the photometry sensor located between the distance measurement sensors, the distance measurement sensors and the photometry sensor being two-dimensional sensors.

In the above embodiments, description has been given of the case where the distance measurement and photometry device according to the present invention is applied to digital cameras. Alternatively, the distance measurement and photometry device according to the present invention can also be implemented in digital video cameras, in-vehicle cameras, mobile cameras, monitoring cameras, and the like as a distance measurement and photometry device performing distance measurement and photometry.

What is claimed is:

1. A distance measurement and photometry device comprising:
   a pair of distance measurement sensors arranged at a predetermined interval;
   a photometry sensor arranged between the distance measurement sensors;
   a pair of distance measurement lenses to form images of a distance measurement target on the distance measurement sensors, respectively;
   a photometry lens to form an image of the distance measurement target on the photometry sensor;
   a distance calculation unit to calculate a distance to the distance measurement target on the basis of a signal outputted from each of the distance measurement sensors; and
   a photometry calculation unit to calculate brightness of the distance measurement target on the basis of a signal outputted from the photometry sensor, wherein
   the distance measurement sensors and the photometry sensor are formed on a single sensor board and each has a plurality of two-dimensional light receiving elements arranged in a lattice.

2. The distance measurement and photometry device according to claim 1, wherein the distance measurement sensors and the photometry sensor have the same size and the same number of pixels, and are integrally cut out from a semiconductor wafer having a plurality of image sensors of a predetermined size formed thereon through a semiconductor process.

3. The distance measurement and photometry device according to claim 1, wherein the distance calculation unit calculates the distance to the distance measurement target by calculating a parallax between images of the distance measurement target formed on certain pixels of the distance measurement sensors, respectively, on the basis of pixel output signals outputted from the respective distance measurement sensors and corresponding to the respective images of the distance measurement target.

4. The distance measurement and photometry device according to claim 1, wherein
   a plurality of the photometry sensors are arranged between the distance measurement sensors, and a plurality of the photometry lenses to form images of the distance measurement target on the respective photometry sensors are arranged, and
   the photometry lenses are formed to have different angles of view, respectively.

5. An imaging apparatus in which an object image is formed on an image sensor through an imaging lens system and image data is generated on the basis of a pixel output signal outputted from the image sensor and corresponding to the object image,
   the imaging apparatus comprising the distance measurement and photometry device according to claim 1 for measuring a distance to an object and brightness of the object.

6. The imaging apparatus according to claim 5, wherein a pixel output signal outputted from at least one of a plurality of pixel regions, into which the entire pixel plane of each of the distance measurement sensors is divided, is outputted to the distance calculation unit in distance measurement.

7. The imaging apparatus according to claim 5, wherein the imaging lens system has an optical zoom function, and when the object is imaged with the imaging lens system zoomed in to a telephoto side, a pixel output signal outputted from any one of a pixel region of the entire pixel plane of each of the distance measurement sensors and a partial pixel region which is a part of the pixel region is outputted to the distance calculation unit in distance measurement, the pixel region corresponding to an imaging region obtained by zooming in the imaging lens system to the telephoto side.

8. The imaging apparatus according to claim 5, further comprising
   another distance calculation unit to calculate a distance to the object on the basis of a pixel output signal outputted corresponding to the object image formed on the image sensor, wherein
   a focus operation of the imaging lens system is performed on the basis of both or a selected one of information on a distance to the object calculated by the other distance calculation unit and information on a distance to the object calculated by the distance measurement and photometry device.

* * * * *